(12) United States Patent
Marshall et al.

(10) Patent No.: US 7,301,147 B2
(45) Date of Patent: Nov. 27, 2007

(54) METHOD AND SYSTEM FOR COMMUNICATING PULSE WIDTH IN A NIGHT VISION SYSTEM POWER SYSTEM

(75) Inventors: Paul Neil Marshall, Avon, CT (US); Craig Boucher, Simsbury, CT (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/259,462

(22) Filed: Oct. 26, 2005

(65) Prior Publication Data

US 2007/0235649 A1    Oct. 11, 2007

(51) Int. Cl.
*H01J 40/14* (2006.01)

(52) U.S. Cl. .............................. 250/330; 250/214 VT; 359/815; 359/407

(58) Field of Classification Search ................ 250/330, 250/214 VT; 359/815, 407, 409
See application file for complete search history.

(56) References Cited

U.S. PATENT DOCUMENTS

| | | | | |
|---|---|---|---|---|
| 4,924,080 A | | 5/1990 | Caserta et al. | 250/213 VT |
| 5,883,381 A | * | 3/1999 | Saldana | 250/214 VT |
| 6,087,660 A | * | 7/2000 | Morris et al. | 250/330 |
| 6,140,574 A | | 10/2000 | Snyder | 174/35 R |
| 6,488,390 B1 | * | 12/2002 | Lebens et al. | 362/231 |

* cited by examiner

*Primary Examiner*—Bao Q. Vu
(74) *Attorney, Agent, or Firm*—Cantor Colburn LLP

(57) ABSTRACT

A night vision system including a power system having a low voltage unit coupled to a high voltage unit. The low voltage unit includes a low voltage controller and a low voltage table correlating step values to pulse widths, the low voltage controller obtaining a desired pulse width and accessing the table to obtain a step value. The high voltage unit including an opto-isolator for receiving the step value from the low voltage controller, a high voltage controller response to the step value accessing a high voltage table correlating step values to pulse width to obtain a pulse width, the high voltage controller generating a control pulse in response to the pulse width.

15 Claims, 1 Drawing Sheet

METHOD AND SYSTEM FOR COMMUNICATING PULSE WIDTH IN A NIGHT VISION SYSTEM POWER SYSTEM

BACKGROUND OF THE INVENTION

Night vision systems are used in a number of applications, including military, industrial, commercial, etc. In general, the systems operate by multiplying light received at an image intensifier tube to generate a visible image. Power conservation is typically an issue with personal night vision systems that are powered by portable, battery supplies. Thus, it is beneficial to incorporate power conservation features in the night vision system in order to extend the operation of the night vision system.

BRIEF SUMMARY OF THE INVENTION

An embodiment of the invention is a night vision system including a power system having a low voltage unit coupled to a high voltage unit. The low voltage unit includes a low voltage controller and a low voltage table correlating step values to pulse widths, the low voltage controller obtaining a desired pulse width and accessing the table to obtain a step value. The high voltage unit including an opto-isolator for receiving the step value from the low voltage controller, a high voltage controller response to the step value accessing a high voltage table correlating step values to pulse width to obtain a pulse width, the high voltage controller generating a control pulse in response to the pulse width.

Other embodiments of the invention include methods for controlling a night vision system. In a low voltage unit, a desired pulse width is obtained. A low voltage table is accessed to obtain a step value. The step value is transmitted to a high voltage unit. The high voltage unit accesses a high voltage table correlating step values to pulse width to obtain a pulse width. The high voltage unit generates a control pulse in response to the pulse width.

DETAILED DESCRIPTION

Figure 1:
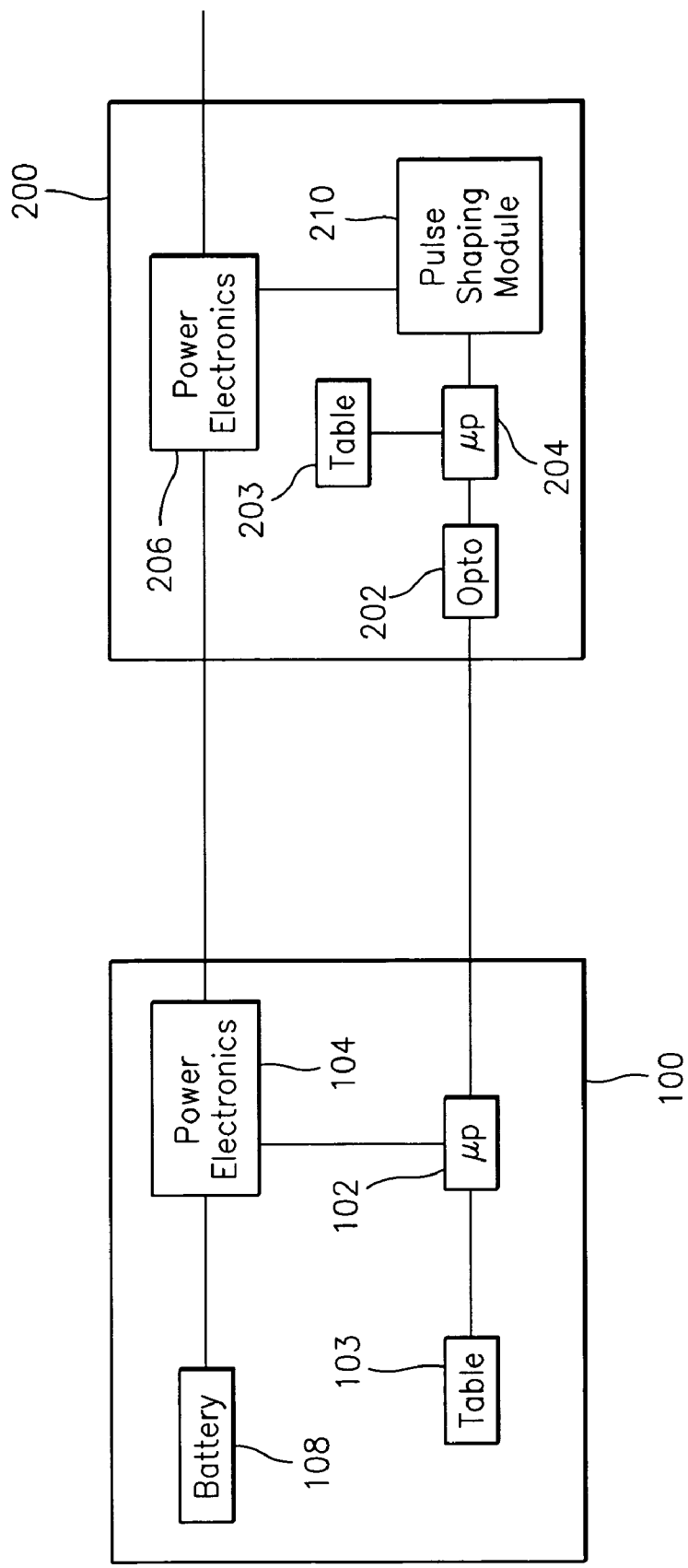
FIG. 1 is a block diagram of power components of a night vision system in exemplary embodiments.

FIG. 1 is a block diagram of power components of a night vision system in exemplary embodiments. The power components include a low voltage unit 100 and a high voltage unit 200. The low voltage unit 100 and the high voltage unit 200 operate with a significant volt FIG. 1 is a block diagram of power components of a night vision system in exemplary embodiments. The power components include a low voltage unit 100 and a high voltage unit 200. The low voltage unit 100 and the high voltage unit 200 operate with a significant voltage potential difference between them. The low voltage unit 100 includes a low voltage controller 102 in communication with low voltage electronics 104 and an opto-isolator 202 in the high voltage unit 200. The low voltage electronics 104 may include amplifiers, inverters, transformers, etc. A battery 108 is coupled to the low voltage electronics 104 to provide power to the high voltage unit 200.

The low voltage controller 102 may be a general-purpose microprocessor executing a computer code contained on a storage medium. Alternatively, the low voltage controller 102 may be implemented using a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of processes in embodiments of the invention.

The low voltage controller 102 interfaces with a low voltage table 103 to retrieve a step value that is transmitted to the high voltage unit as described in further detail herein. Low voltage table 103 may be a look-up table through which the low power controller 102 obtains a step value based on a desired pulse width. Low voltage table 103 may be stored in memory located in low power controller 102 or a separate device accessible by low power controller 102.

The opto-isolator 202 serves as an optically isolated one-way data link used to transfer information from the low voltage unit 100 to the high voltage unit 200. One of the information items is a step value, which corresponds to a desired pulse width. The step value represents the desired pulse width to be used in the high voltage unit and is obtained from low voltage table 103 as described in further detail herein. In an exemplary embodiment, the step value is an N-bit digital word representing the desired pulse width. Once the step value is received by the high voltage unit 200, the high voltage 200 generates a control pulse with a duration between 1250 µs and 300 ns by accessing high voltage table 203 with the step value. The opto-isolator 202 receives the step value and provides the step value to the high voltage controller 204. The high voltage controller 204 uses the step value to interface with pulse shaping module 210 to control high voltage power electronics 206 that bias the night vision system.

The high voltage controller 204 interfaces with high voltage table 203 to retrieve a pulse width in response to the step value transmitted from the low voltage unit 100. High voltage table 203 may be a look-up table through which the high power controller 204 obtains a pulse width based on the received step value. High voltage table 203 may be stored in memory located in high power controller 204 or a separate device accessible by high power controller 204.

A conventional method of defining a pulse width is to create a digital word where each count equals the minimum resolution. In power system of FIG. 1 with a minimum pulse resolution of 1 ns and a maximum value of 1250 µs, a digital word scaled at 1 count=1 ns would need to be capable of storing 1,250,000 counts to accommodate the desired resolution and maximum range. This requires a 21 bit digital word to represent 1,250,000 counts.

As noted above, a constraint of the night vision power system is power consumption. Sending 21 data bits drives up system power due to the energy required to drive the opto-transmitter for that many bits as well as the real-time power consumption needed during the data transmission and reception.

As described above, the low voltage unit accesses low voltage table 103 to obtain a step value corresponding to a desired pulse width. The step value uses a reduced number of bits to communicate the pulse width. Exemplary step values and pulse widths are shown in Table 1. The pulse values start at the maximum, e.g., 1250 µs and go down by a percentage (e.g., 2.5%) in each step. A total of 336 steps are defined from 0 to 335 corresponding to pulse widths from 1250 µs to 319 ns.

TABLE 1

Pulse Widths

| Step | Pulse Width |
|---|---|
| 0 | 1250.000 μs |
| 1 | 1219.512 μs |
| 2 | 1189.768 μs |
| ... | ... |
| 333 | 0.336 μs |
| 334 | 0.327 μs |
| 335 | 0.319 μs |

In operation, the low voltage controller 102 determines the desired pulse width and accesses low voltage table 103 to determine the appropriate step value. The low voltage unit 100 sends a digital word representing the step value by accessing low voltage table 103 indexing the desired pulse width to the step value. Accordingly, instead of sending the pulse width value across the data link, a step value from Table 1 is sent. Using this method, the data transmitted across the data link need only be 10 bits as opposed to 21 bits if the pulse width value is sent. Nine bits are used to send the step value and a tenth bit may be included as a steering bit to direct the 9 bit word to the appropriate high power circuitry. Sending 10 bits results in a 2× power reduction and transmission time reduction as compared to sending 21 bits.

The low voltage controller 102 sends the step value to the high voltage controller 204 through opto-isolator 202. The high voltage controller 204 accesses high voltage table 203, which is a local copy of low voltage table 103, and determines the pulse width corresponding to the received step value. The high voltage controller 202 causes this pulse width to be produced though pulse shaping module 210, which in-turn drives high voltage electronics 206 through a control pulse. For example, the high voltage electronics 206 may include a digital to analog converter and several analog output functions, all of which reside in the high voltage block.

This communication protocol uses less power and communication time than standard digital communication protocols. Using tables 103 and 203 provides fast, low power operation. The use of a correlation table based upon a 2.5% change between steps results in a logarithmic scaling relationship between inputs to output.

As described above, the embodiments of the invention may be embodied in the form of processor-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A night vision system comprising:
a power system having a low voltage unit coupled to a high voltage unit;
the low voltage unit including a low voltage controller and a low voltage table correlating a plurality of step values to a plurality of pulse widths, the low voltage controller obtaining a desired pulse width and accessing the table to obtain a step value;
the high voltage unit receiving the step value from the low voltage controller, a high voltage controller response to the step value accessing a high voltage table correlating step values to pulse width to obtain a pulse width, the high voltage controller generating a control pulse in response to the pulse width.

2. The night vision system of claim 1 wherein:
the high voltage table is a copy of the low voltage table.

3. The night vision system of claim 1 wherein:
the high voltage unit includes high voltage power electronics responsive to the control pulse.

4. The night vision system of claim 1 wherein:
the step value is represented using 9 bits.

5. The night vision system of claim 4 wherein:
the step value is transmitted with a steering bit.

6. The night vision system of claim 1 wherein:
the pulse width represented by the step value ranges from 1250 us to 300 ns.

7. The night vision system of claim 1 wherein:
the step value corresponds to pulse widths ranging from a maximum value and decreasing logarithmically to a minimum value.

8. The night vision system of claim 7 wherein:
the pulse widths decrease from the maximum value to the minimum value in decrements of 2.5%.

9. A method for controlling a night vision system, the method comprising:
in a low voltage unit, obtaining a desired pulse width and accessing a low voltage table correlating a plurality of pulse widths to a plurality of step values to obtain a step value;
transmitting the step value to a high voltage unit;
in the high voltage unit, accessing a high voltage table correlating step values to pulse width to obtain a pulse width, the high voltage unit generating a control pulse in response to the pulse width.

10. The method of claim 9 wherein:
the high voltage table is a copy of the low voltage table.

11. The method of claim 9 wherein:
the step value is represented using 9 bits.

12. The method of claim 11 wherein:
the step value is transmitted with a steering bit.

13. The method of claim 9 wherein:
the pulse width represented by the step value ranges from 1250 us to 300 ns.

14. The method of claim 9 wherein:
the step value corresponds to pulse widths ranging from a maximum value and decreasing logarithmically to a minimum value.

15. The method of claim 14 wherein:
the pulse widths decrease from the maximum value to the minimum value in decrements of 2.5%.

\* \* \* \* \*